United States Patent

Shiramasa

[19]

[11] Patent Number: 5,901,624
[45] Date of Patent: May 11, 1999

[54] WORKPIECE TRANSFER APPARATUS

[75] Inventor: Yoshio Shiramasa, Fuchu, Japan

[73] Assignee: Kitagawa Iron Works Co., Ltd., Fuchu, Japan

[21] Appl. No.: 09/023,829

[22] Filed: Feb. 13, 1998

Related U.S. Application Data

[62] Division of application No. 08/511,644, Aug. 7, 1995, Pat. No. 5,782,151.

[51] Int. Cl.$^6$ .......................... B23B 13/12; B23B 13/02; B23B 13/10; B23B 31/06
[52] U.S. Cl. ............................... 82/124; 82/125; 269/14; 279/155
[58] Field of Search ..................... 82/124, 125; 74/89.15, 74/459, 665 B, 665 E; 483/44, 45, 49; 414/728, 735; 279/155; 269/13, 14

[56] References Cited

U.S. PATENT DOCUMENTS

| | | | |
|---|---|---|---|
| 3,226,886 | 1/1966 | Seidel | 82/125 |
| 3,824,890 | 7/1974 | Zettler et al. | 409/134 |
| 4,065,988 | 1/1978 | Lohneis et al. | 82/124 |
| 4,316,398 | 2/1982 | Link et al. | 82/125 |
| 4,458,566 | 7/1984 | Tajima | 82/124 |
| 4,646,422 | 3/1987 | McMurtry | 82/125 |
| 4,787,280 | 11/1988 | Voelkerding | 82/125 |
| 4,833,772 | 5/1989 | Kobayashi et al. | 483/45 |
| 5,246,414 | 9/1993 | Hallbach | 82/131 |
| 5,308,201 | 5/1994 | Wilson et al. | 409/134 |
| 5,782,151 | 7/1998 | Shiramasa | 82/124 |

FOREIGN PATENT DOCUMENTS

| | | | |
|---|---|---|---|
| 3631718 | 3/1988 | Germany | 82/124 |
| 192703 | 11/1983 | Japan | 82/125 |
| 206303 | 12/1983 | Japan | 82/125 |
| 226201 | 10/1986 | Japan | 82/124 |
| 402180504 | 7/1990 | Japan | 82/124 |
| 404082603 | 3/1992 | Japan | 82/124 |
| 530778 | 4/1977 | U.S.S.R. | 409/134 |

*Primary Examiner*—Steven C. Bishop
*Attorney, Agent, or Firm*—Alston & Bird, LLP

[57] ABSTRACT

An apparatus for transferring workpieces to and from the chuck of a machine tool. A gripper arm is mounted to the machine frame for selectively axial and rotational movement on a shaft having helical and longitudinal threads on the surface thereof. A first nut is rotatably mounted to the machine frame for axial advancement of the shaft and a second nut is rotatably mounted for rotational advancement. The apparatus may also include a panel mounted to the machine frame between a transfer station and the chuck. An opening in the panel adjacent the transfer station has surfaces which mate with corresponding surfaces of the gripper arm so as to preclude the passage of debris to the transfer station. The apparatus may also include an apparatus for sequentially transferring a series of workpieces. The apparatus has a two gripper jaws and a compressible pusher plate therebetween which is compressed as it is moved towards an opening in an input chute so that a workpiece may roll between the jaws of the gripper.

6 Claims, 6 Drawing Sheets

WORKPIECE TRANSFER APPARATUS

RELATED APPLICATIONS

This application is a divisional of application Ser. No. 08/511,644 filed Aug. 7,1995, now U.S. Pat. No. 5,782,151.

FIELD OF THE INVENTION

The present invention relates to a workpiece transfer apparatus and more particularly, to a workpiece transfer apparatus for machine tools.

BACKGROUND OF THE INVENTION

In conventional machine tools, such as lathes, a workpiece is securely supported in a chuck during the machining operation. The chuck is mounted on one end of a spindle and the spindle is rotated so that a tool may be brought into contact with the rotating workpiece. The tool has a cutting edge which cuts into the workpiece to remove material so that the workpiece can be machined to the desired shape and size. The material thus cut from the workpiece by the tool may take the form of discrete chips. If desirable, a liquid coolant may be used to lubricate the cutting edge of the tool and to prevent heat buildup.

To automate the machining operation, it is desirable to provide an automatic chuck which can be controlled to selectively grip or release a workpiece disposed within the jaws of the chuck. To more fully automate the machining operation, however, it is also desirable to provide a workpiece transfer apparatus for loading workpieces into the chuck before the machining operation is performed and for unloading the workpieces from the chuck after the machining operation has been completed. The workpiece transfer apparatus may pick up unmachined workpieces from a loading station such as a chute or bin adjacent to the machine tool. In addition, the workpiece transfer apparatus may unload workpieces from the chuck and transfer them to an unloading station such as a chute or bin adjacent to the machine tool.

Conventional workpiece transfer devices may include a moveable shaft having a workpiece gripping mechanism mounted on one end thereof. Such shafts are typically moveable axially along the shaft axis, known in the art as the "Z direction", and may also be moveable rotationally about the shaft axis, known in the art as the "C direction". Such workpiece transfer devices may include a motor for providing the rotational movement in the C direction and a hydraulic or pneumatic cylinder for advancing and withdrawing the shaft along its axis in the Z direction. These transfer devices therefore require both an electrical power source for the rotational motor and a separate hydraulic or pneumatic power source for moving the shaft axially.

Another type of workpiece transfer device is disclosed in U.S. Pat. No. 4,646,422 to McMurtry. The device of the McMurtry patent comprises a transfer mechanism including a shaft supported at both ends for rotation thereof. An arm is supported on the shaft for movement along the axis of the shaft but is fixed against rotation relative to the shaft. A first motor rotates the shaft and a second motor rotates a threaded rod inside the shaft to move the arm in an axial direction along the shaft. The shaft, however, extends substantially between the tool and chuck of the machine and thus limits access to the machining area. In addition, the workpiece transfer mechanism is subjected to chips and coolant produced by the machining operation.

Another type of workpiece transfer device is disclosed in U.S. Pat. No. 4,458,566 to Tajima. The Tajima patent discloses a device having an arm secured to the end of a moveable shaft. The shaft of the Tajima patent is moveable both axially and rotationally about its axis. However, rotational movement is provided by a threaded rod which is mounted perpendicularly to the arm axis and, as such, is limited to rotation through an arc determined in part by the length of the rod. Such limited rotational movement limits the loading and unloading capability of the arm.

The chips and coolant produced by the machining operation are often expelled from the vicinity of the tool in unpredictable trajectories. Moreover, errant chips and coolant can be detrimental to the machine tool. For example, chips may interfere with the operation of the gripper devices used for loading and unloading workpieces. Thus, it is desirable to confine chips and coolant to the immediate vicinity of the machining operation.

The workpiece gripping mechanisms of conventional workpiece transfer devices typically include a three-jawed chuck and a pusher plate spring-loaded between the jaws. The workpieces are picked up from an opening at the end of a declining input chute by the gripping mechanism and are transferred to the chuck. A workpiece is positioned at the opening of the chute and is restrained from falling through the opening by a moveable shutter. The gripping mechanism is moved towards the workpiece, the shutter is opened and the pusher plate engages the workpiece. The jaws are then closed and the workpiece can be removed from the chute.

More workpieces may be restrained further up the input chute so as not to interfere with the operation of the three jaws of the gripping mechanism. The workpieces may be restrained by two retractable gates operating in an escapement fashion so as to allow only one workpiece at a time to advance to the opening. Workpiece transfer devices of this type thus require the provision of a moveable shutter and two retractable gates which adds to the expense and complexity of the transfer apparatus.

It is therefore an object of the present invention to provide an improved workpiece transfer apparatus for machine tools.

It is still another object of the present invention to provide an improved workpiece transfer apparatus which allows full access to the machining area and which has improved mobility.

It is yet another object of the present invention to provide an improved machine tool which provides improved confinement of chips and coolant produced during the machining operation.

It is yet another object of the present invention to provide an improved work transfer apparatus having fewer actuated components.

SUMMARY OF THE INVENTION

These and other objects and advantages of the present invention are achieved in the embodiments illustrated herein by the provision of an apparatus for transferring workpieces having a gripper arm supported on a shaft and moveable both rotationally and axially by a pair of rotatable nuts on the shaft.

The apparatus includes a machine frame and means for mounting the gripper arm thereto so as to permit selective rotational movement about an axis and selective axial movement along the axis. The mounting means includes the drive shaft mounted for rotation about the axis and having the gripper arm mounted on one end of the shaft. The drive shaft has at least one helical thread and one longitudinal thread on the surface thereof, which threads may comprise one or more grooves forming depressions in the surface of the shaft.

A first nut is rotatably mounted on the drive shaft and is fixed to the machine frame against axial movement. The first nut has an internal thread which engages the helical thread of the shaft. The internal thread may comprise a series of balls retained in the nut and entrained within the helical groove. The first nut is selectively rotated by a first reversible drive motor so as to axially advance or retract the shaft.

A second nut is also rotatably mounted on the drive shaft and is fixed to the machine frame against axial movement. The second nut has an internal thread which engages the longitudinal thread of the shaft. The internal thread may comprise a series of balls retained in the nut and entrained within the longitudinal groove. The second nut is selectively rotated by a second reversible drive motor so as to cause rotational movement of the shaft about the axis.

The apparatus may also include control means for selectively operating the first and second motors so that the gripper arm can be moved between a first position adjacent the transfer station and a second position adjacent the work station such as may be desirable when the first and second positions are both axially and rotationally offset from each other. The control means may also include brake means which acts on the second drive motor so as to prevent unwanted rotation of the shaft. In this manner, the shaft can be moved in a purely axial direction without any rotation.

A workpiece loading means and workpiece unloading means may be mounted to the machine frame at the transfer station so as to define respective loading and unloading stations. The gripper arm may also include first and second gripper jaw assemblies for releasably engaging and supporting a workpiece. The first and second gripper jaw assemblies are positioned adjacent each other such that they may be simultaneously positioned at the loading and unloading stations respectively by the control means.

The gripper jaw assemblies may each include jaw means. The jaw means of the first gripper assembly may include two jaws and the jaw means of the second gripper assembly may include three jaws, the respective jaws being selectively moveable towards and away from each other.

A machine tool is provided in another aspect of the invention having provision for transferring a workpiece between a transfer station and a machining station. The machine tool has a panel mounted to the machine frame so as to have the transfer station, defined by a workpiece transfer means, on one side thereof and the machining station, defined by the machine tool chuck, on the other side thereof. The panel has an opening therethrough adjacent to the transfer station.

The machine tool has a gripper arm having at least one gripper jaw assembly and means mounting said gripper arm to the machine frame so that the gripper arm is on the same side of the panel as the chuck. The mounting means provides selective movement of the gripper arm between a first position wherein the gripper jaw assembly extends through the opening and is adjacent the transfer station, and a second position wherein the gripper jaw assembly is adjacent the chuck. The mounting means may include a drive shaft mounted for rotation about an axis, first drive means for axially advancing or retracting the drive shaft along the axis, and second drive means for rotating the shaft about the axis. The first and second drive means may be mounted on the same side of the panel as the transfer station.

The gripper arm and the panel have mating surfaces which cooperate to form a seal surrounding the opening when the gripper arm is in the first position. This precludes debris such as chips and coolant from passing through the opening and reaching the gripper jaw assembly when the gripper arm is in the first position.

In another aspect of the invention, an apparatus for sequentially transferring a series of workpieces from a transfer station is provided and includes a gripper arm moveable towards and from the transfer station. The gripper arm includes a pair of releasable jaws for engaging a workpiece when at the transfer station and a compressible pusher plate for engaging a workpiece gripped in the jaws. Stop means is provided for compressing the pusher plate as it is moved towards the transfer station. Chute means is provided for advancing one of the workpieces to the transfer station when the gripper arm is positioned adjacent the transfer station so that the workpiece will be positioned between the jaws. Chute means may include a bottom rail declined towards the transfer station, a bumper at the end of the bottom rail and first and second side rails extending generally to the transfer station with the first side rail having an opening therein adjacent the transfer station.

BRIEF DESCRIPTION OF THE DRAWINGS

Some of the objects and advantages of the present invention have been stated, others will appear as the description proceeds when taken in conjunction with the accompanying drawings in which.

DETAILED DESCRIPTION OF A PREFERRED EMBODIMENT

The present invention will now be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

Figure 1:
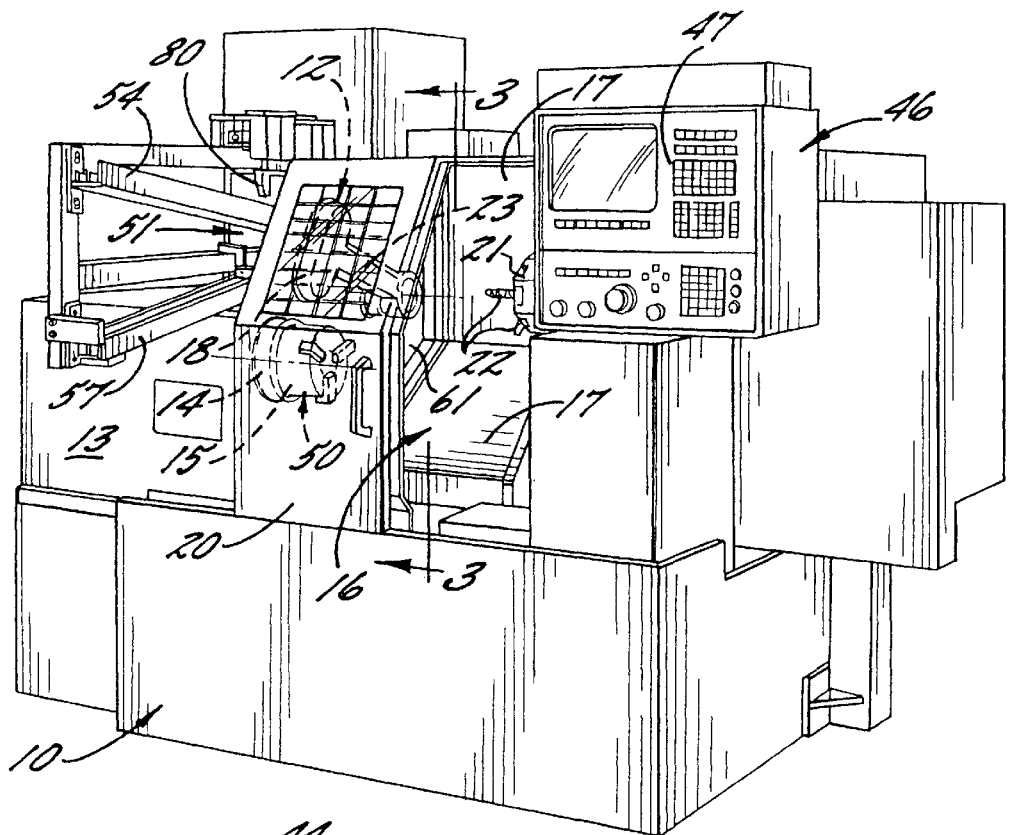
FIG. 1 is a perspective view of a machine tool having the work transfer apparatus according to the present invention mounted thereon.

Referring more particularly to the drawings, FIG. 1 illustrates a machine tool 10 for machining workpieces 11 having a workpiece transfer apparatus 12 according to the present invention mounted thereto. The machine tool 10 includes a machine frame 13 and a motor driven spindle 14 rotatably supported thereon. Mounted on one end of the spindle 14 is a chuck 15 which preferably comprises an automatic chuck of the type wherein workpieces 11 may be selectively gripped and released.

The chuck 15 extends into a machining enclosure 16 which is defined by several walls 17 and a door 20, as discussed in more detail below. A tool turret 21 capable of supporting one or more tools 22 is also disposed within the machining enclosure 16. The tool turret 21 is mounted such that a selected tool 22 may be brought into contact with the workpiece 11 and the desired machining operation performed thereon.

Figure 6:
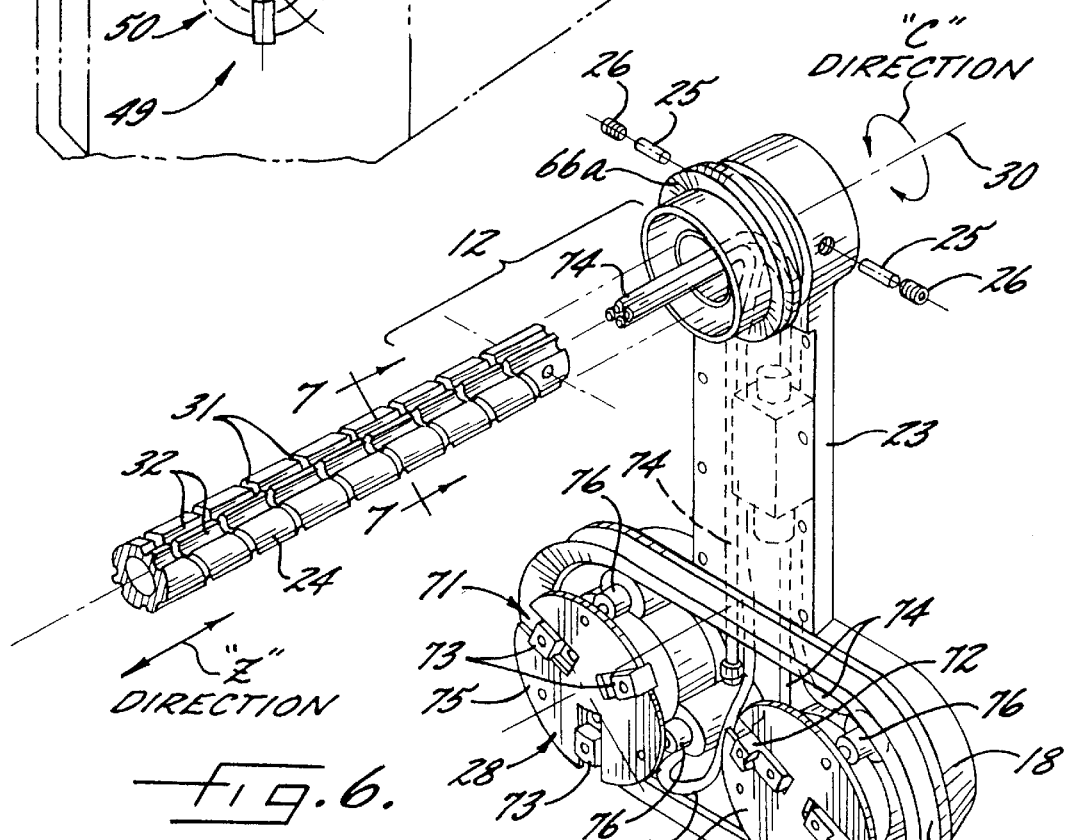
FIG. 6 is a perspective and exploded view of the gripper arm illustrating the drive shaft and the gripper jaw assemblies.

Also disposed within the machining enclosure 16 is a gripper arm 23 for transferring workpieces 11 to and from the chuck 15. Mounting means 29 support the gripper arm 23 on the machine frame 13 for axial and rotational movement. The gripper arm 23, as shown in FIG. 6, is securely attached to one end of a moveable drive shaft 24 by dowel pins 25 and locking screws 26. The radially outward end of the gripper arm 23 includes a head 18 whereon first and second gripper jaw assemblies 27, 28 may be mounted, as discussed in more detail below.

The drive shaft 24 defines an axis 30, and is mounted to the machine frame 13 for selective movement longitudinally along its axis, i.e., the Z direction, and rotationally about its axis, i.e., the C direction. The drive shaft 24 has at least one helical thread 31 and at least one longitudinal thread 32 formed thereon which extend along the length of the shaft 24.

Figure 2:
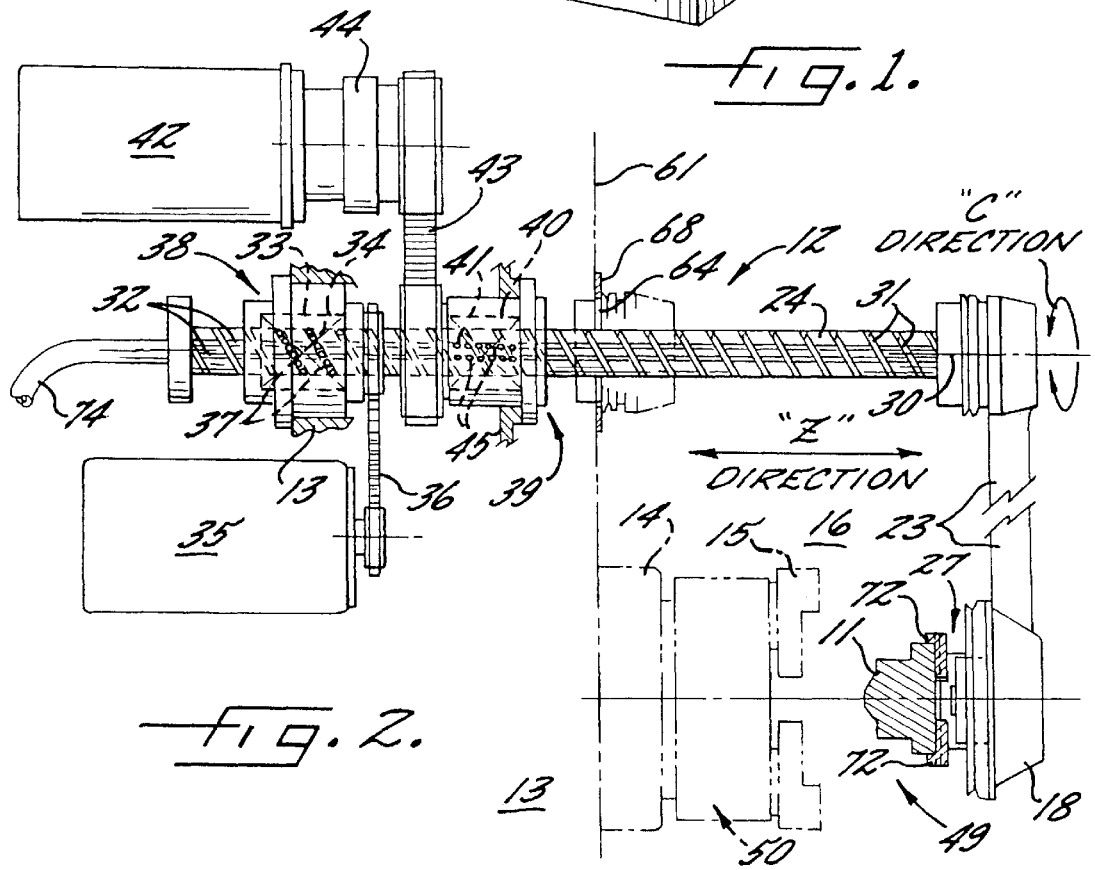
FIG. 2 is a schematic view of the workpiece transfer apparatus of the present invention.
Figure 8:
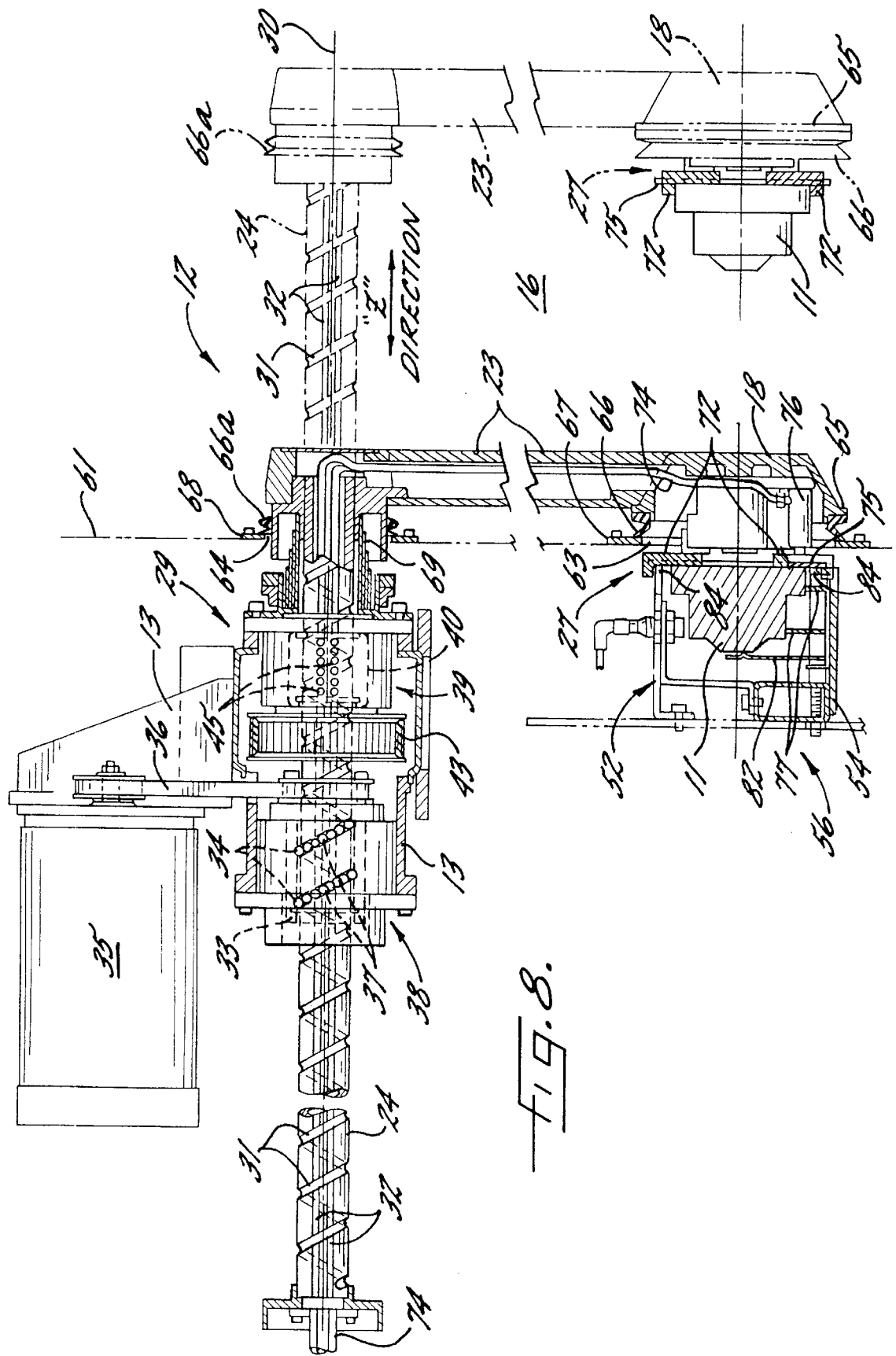
FIG. 8 is a sectional view of the workpiece transfer apparatus of the present invention taken along lines 8—8 of FIG. 3.

As shown in FIG. 2, the drive shaft 24 is partially supported by first drive means 38 including a first nut 33 having at least one internal helical thread 34 engaging the helical thread 31 of the drive shaft 24. The first nut 33 is mounted to the machine frame 13 so as to allow rotation thereof but is fixed against axial movement along the axis 30 of the drive shaft 24, as shown in FIG. 8. The first nut 33 is connected to a first reversible drive motor 35 via a belt 36 so as to allow selective rotation of the first nut 33. Accordingly, as the nut 33 is rotated in one direction, the nut thread 34 advances along the shaft thread 31 and the shaft 24 is axially moved in a Z direction (depending on the helical orientation of the thread) relative to the axially fixed nut. Conversely, if the nut 33 is rotated in the other direction, the shaft 24 is moved axially in the opposite direction.

Figure 7:
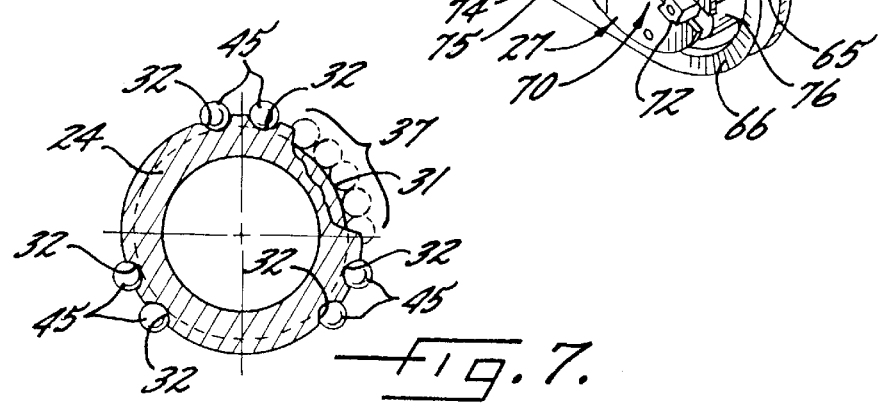
FIG. 7 is an enlarged sectional view of the drive shaft of the workpiece transfer apparatus of the present invention, taken along lines 7—7 of FIG. 6.

The helical shaft thread 31 may comprise a groove formed on the outer surface of the shaft 24 as shown in FIGS. 6 and 7. Alternatively, the helical thread 31 may comprise a raised thread extending on the surface of the drive shaft 24, such as a screw thread. In addition, more than one thread could be used so that, in the case of two threads, the shaft 24 would have a double helix thread pattern.

The internal thread 34 of the nut 33 preferably comprises a series of balls 37 arranged in a helical fashion within the nut 33, conventionally referred to as a ball screw. The balls 37 are restrained within the nut 33 but are free to rotate therein. Alternatively, the nut 33 may comprise a nut of the recirculating type wherein the balls 37 recirculate through the nut. Accordingly, the entrained balls 37 roll along the helical groove of the drive shaft 24 as the nut 33 is rotated.

Figure 9:
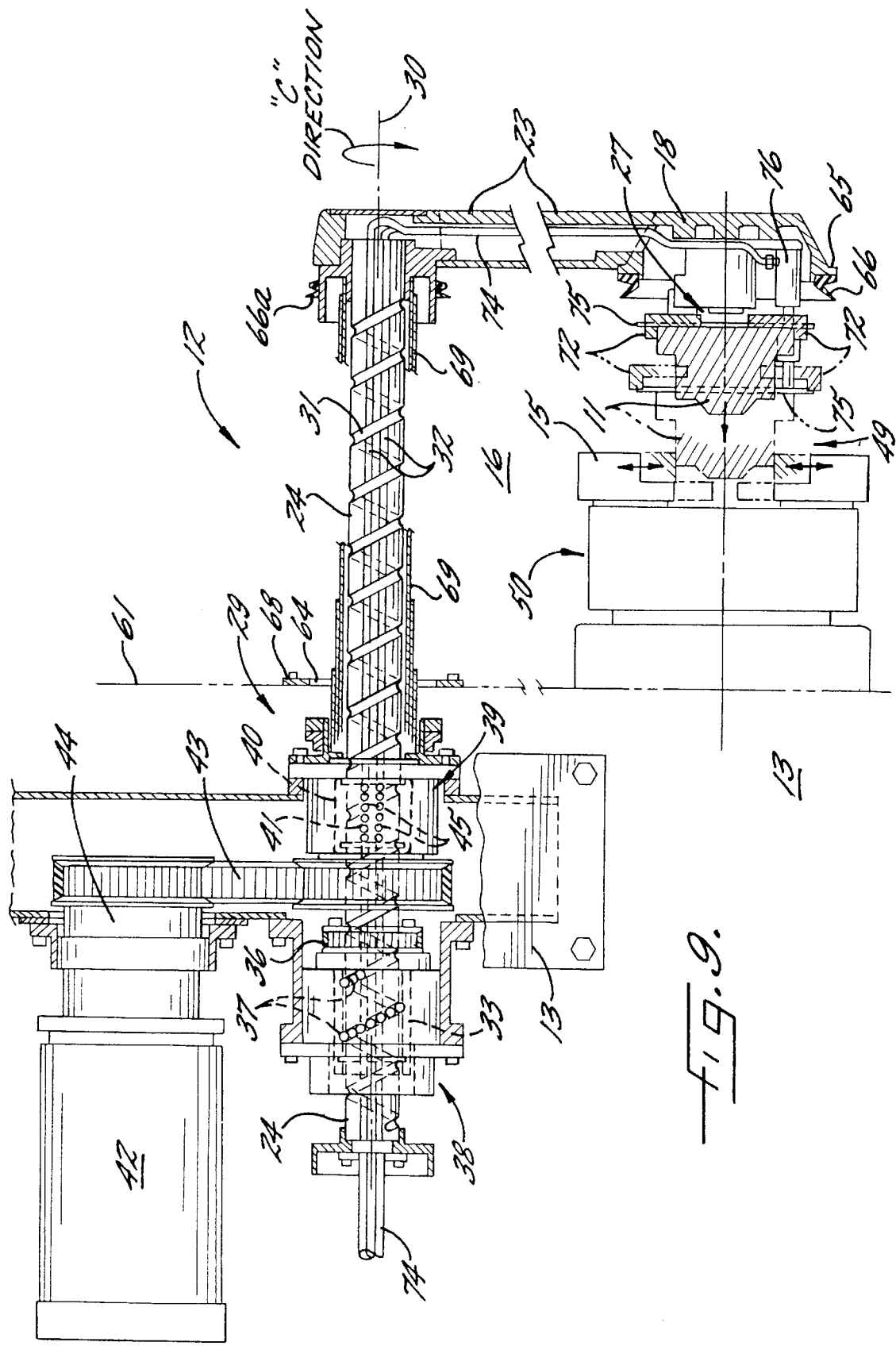
FIG. 9 is a sectional view of the workpiece transfer apparatus of the present invention taken along lines 9—9 of FIG. 3.

As shown in FIG. 2, the drive shaft 24 is also supported by second drive means 39 comprising a second nut 40 having at least one internal longitudinal thread 41 engaging the longitudinal thread 32 of the drive shaft 24. The second nut 40 is also mounted to the machine frame 13 so as to allow rotation thereof and is fixed against axial movement along the axis 30 of the drive shaft 24, as shown in FIG. 9. The second nut 40 is connected to a second reversible drive motor 42 via a belt 43 so as to allow selective rotation of the second nut 40. Accordingly, as the second nut 40 is rotated, the internal thread 41 of the nut 40 engages the longitudinal thread 32 of the drive shaft 24 and causes rotational movement of the drive shaft about its axis 30 in the C direction. The second reversible drive motor 42 may also include a selectively operable brake 44 for preventing rotation of the second nut 40 and therefore the drive shaft 24.

The longitudinal shaft thread 32 may comprise one or more grooves formed on the outer surface of the shaft 24 and extending parallel to the axis 30 of the shaft 24. Preferably, as shown in FIGS. 6 and 7, the longitudinal shaft thread 32 comprises three pairs of grooves spaced evenly about the periphery of the shaft 24. Alternatively, the longitudinal thread 32 may comprise one or more raised threads extending along the drive shaft 24, such as one or more splines.

The internal thread 41 of the nut 40 preferably comprises one or more series of balls 45 arranged longitudinally within the nut 40. The balls 45 are restrained within the nut 40 but are free to rotate therein. Alternatively, the second nut 40, may also be of the recirculating type. Accordingly, the entrained balls 45 roll along the longitudinal grooves of the drive shaft 24 as the shaft is moved axially through the nut 40.

Accordingly, to move the gripper arm 23 in the Z direction the first drive motor 35 is operated. The shaft 24 may, however, have a tendency to rotate which may be caused by torque applied to the shaft 24 by the operation of the first nut 33 or by the radially extended weight of the gripper arm 23 and any workpiece 11 gripped therein. Thus, to prevent any unwanted rotation, the brake 44 associated with the second motor 42 may be engaged.

To rotate the gripper arm 23, the brake 44 is disengaged and the second motor 42 is operated. Thus, while the shaft 24 is being rotated, the first nut 33 rotates with the shaft and does not move rotationally relative to the shaft.

A control means 46, such as a computer or other controller, is also provided to control the operation of both motors 35, 42 and the brake 44. The controller may be programmed by an operator through a control panel 47 mounted on the machine tool 10, as shown in FIG. 1. The control means 46 may also control the other functions the machine tool 10 such as, for example, the opening and closing of the automatic chuck 15, the rotation of the spindle 14 and the movement of the tool 22 relative to the workpiece 11, such that a fully automated machining operation may be coordinated. Thus, the gripper arm 23 may be moved in the Z direction or the C direction, or any combination thereof, by selective sequential or simultaneous operation of the respective drive motors 35, 42.

The workpiece transfer apparatus 12 according to the present invention thus can transfer workpieces 11 between two positions which may be both axially and laterally offset from each other. For example, the workpiece 11 may be transferred between a first position for loading a workpiece 11, as shown in FIG. 8, and a second position adjacent a work station 49, as shown in FIG. 9. A work station 49 according to the present invention may comprise a machining station 50 such as the automatic chuck 15 discussed above. The first position for loading a workpiece 11 is discussed in more detail below.

Figure 3:
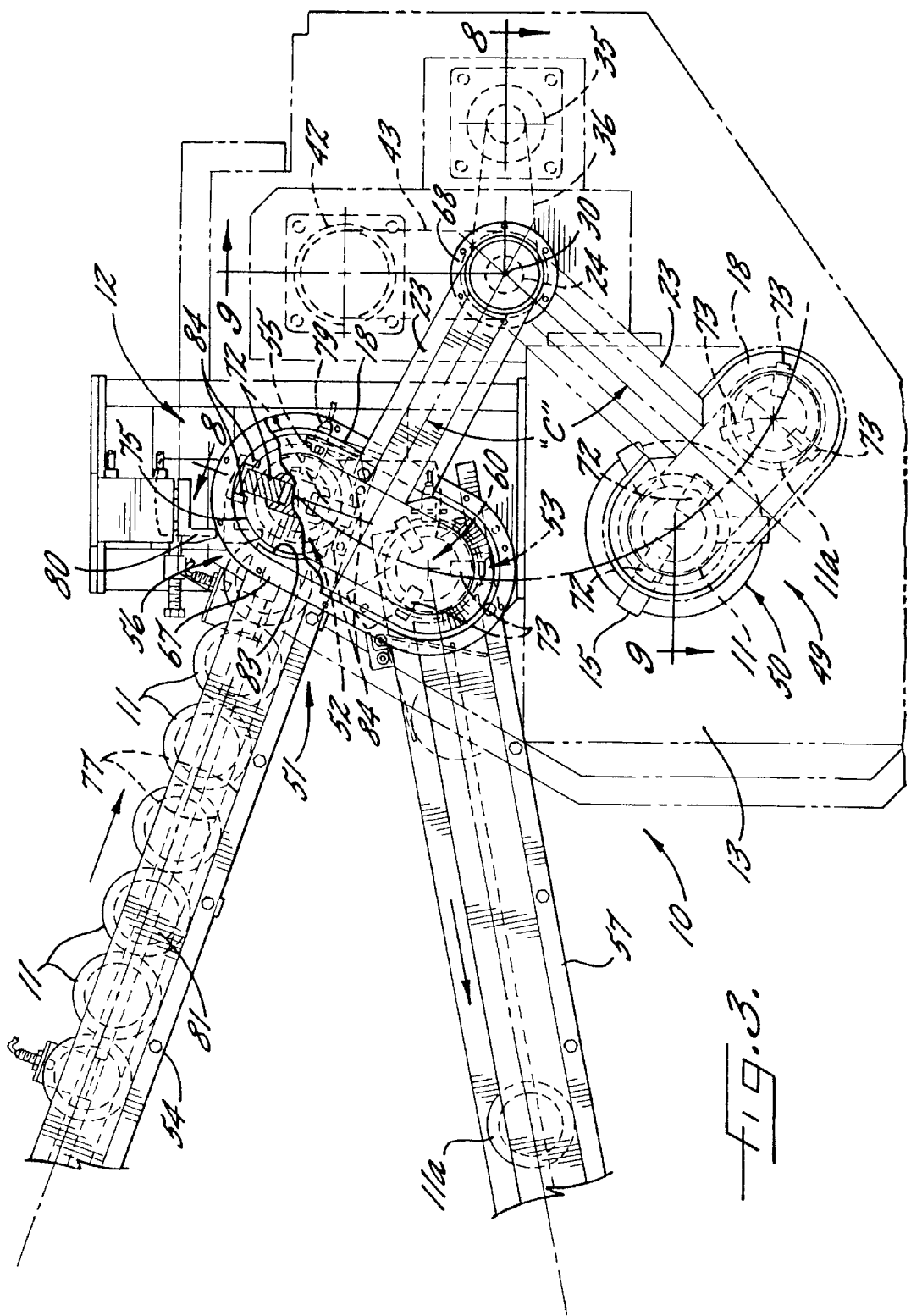
FIG. 3 is a front elevational view of the workpiece transfer apparatus of the present invention taken along lines 3—3 of FIG. 1 wherein part of the gripper arm head is cut away to show the first gripper jaw assembly.

A workpiece transfer means 51 may be mounted to the machine frame 13, as shown in FIG. 3. The workpiece transfer means 51 may comprise a loading means 52 and an unloading means 53. The workpiece loading means 52 has an input chute means 54 which extends downwardly to the machine frame 13. Unmachined workpieces 11 are placed on the chute 54 by an operator or by an automated conveyor (not shown), and roll downwardly towards a bumper 55 at the end of the chute 54. The end of the chute 54 thus defines a loading station 56 from which unmachined workpieces 11 are loaded into the first gripper jaw assembly 27 mounted on the head 18 of the gripper arm 23.

The workpiece unloading means 53 may comprise an output chute 57 extending downwardly away from the machine frame 13. The upper end of the output chute 57 defines an unloading station 60 at which machined parts 11a are unloaded from the second gripper jaw assembly 28.

The unloading station 60 is adjacent to the loading station 56 and the first and second gripper jaw assemblies 27, 28 are laterally offset from each other by a distance equal to the distance between the loading and unloading stations 56, 60. Accordingly, the first and second gripper jaw assemblies 27, 28 may be simultaneously positioned at the loading and unloading stations 56, 60, respectively.

Figures 4A, 4B, 4C:
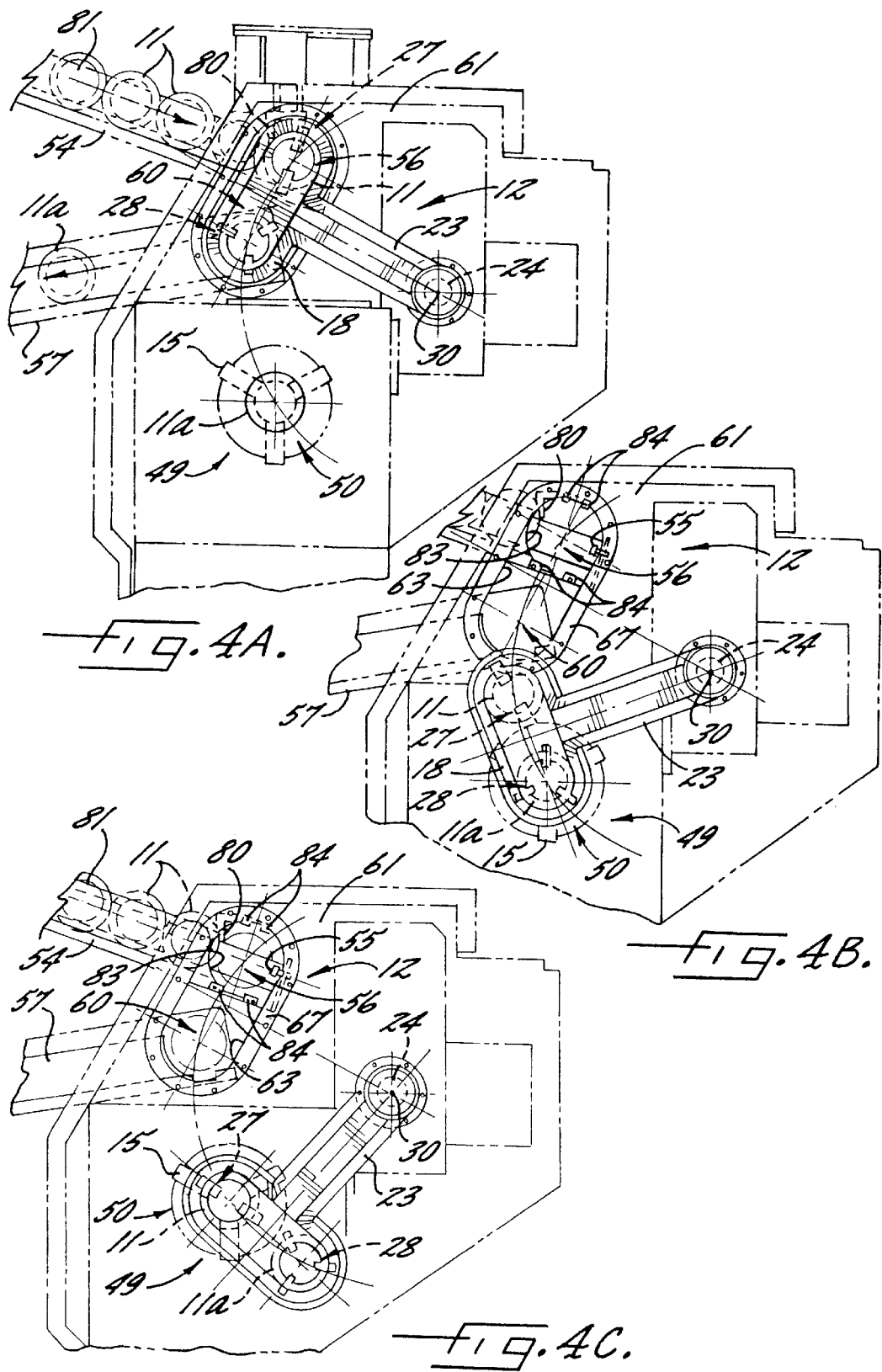
FIGS. 4A through 4C are front elevational views of the workpiece transfer apparatus of the present invention, illustrating sequentially the steps taken in loading and unloading workpieces to and from the chuck.

The operation of the workpiece transfer apparatus 12 of the present invention is shown in FIGS. 4A through 4C. As shown in this sequence, a workpiece 11a which has just been machined is replaced in the chuck 15 with an unmachined workpiece 11. Starting with FIG. 4A, when the gripper arm 23 is in the first position, an unmachined workpiece 11 is loaded into the first gripper jaw assembly 27 at the workpiece loading station 56, as shown in FIG. 8. The gripper arm 23 is then moved axially away from the first position by operation of the first motor 35, as discussed above and as shown in phantom in FIG. 8. The brake 44 of the second motor 43 may be simultaneously engaged to prevent unwanted rotation of the gripper arm 23. The brake 44 is then released and the second motor 42 is operated so that the gripper arm 23 is rotated downwardly to the position shown in FIG. 4B.

The brake 44 is engaged and the first motor 35 is operated in the opposite direction so that the gripper arm 23 is moved axially inwardly towards the chuck 15. The second gripper jaw assembly 28 then picks up a machined workpiece 11a from the automatic chuck 15. The first motor 35 is again engaged and the gripper arm 23 is moved axially away from the chuck 15. The gripper arm 23 is rotated further downwardly to the position shown in FIG. 4C and the gripper arm 23 is moved axially inwardly, also as shown in FIG. 9. The first gripper jaw assembly 27 is released and the unmachined part is deposited in the automatic chuck 15. The gripper arm 23 is then rotated upwardly to the position shown in FIG. 4A, and the gripper arm is moved axially inwardly to again assume the first position. The second gripper jaw assembly 28 is subsequently released and the machined workpiece 11a rolls away from the unloading station 60 on the output chute 57. The output chute 57 may empty into a bin or onto a conveyor.

As shown in FIG. 1, the chuck 15, gripper arm 23 and tool turret 21 are disposed within the machining enclosure 16. The enclosure 16 is defined by several walls 17 and a moveable door 20 and confines chips and coolant within the enclosure to protect other machine tool 10 parts and the machine tool operator.

Figure 5:
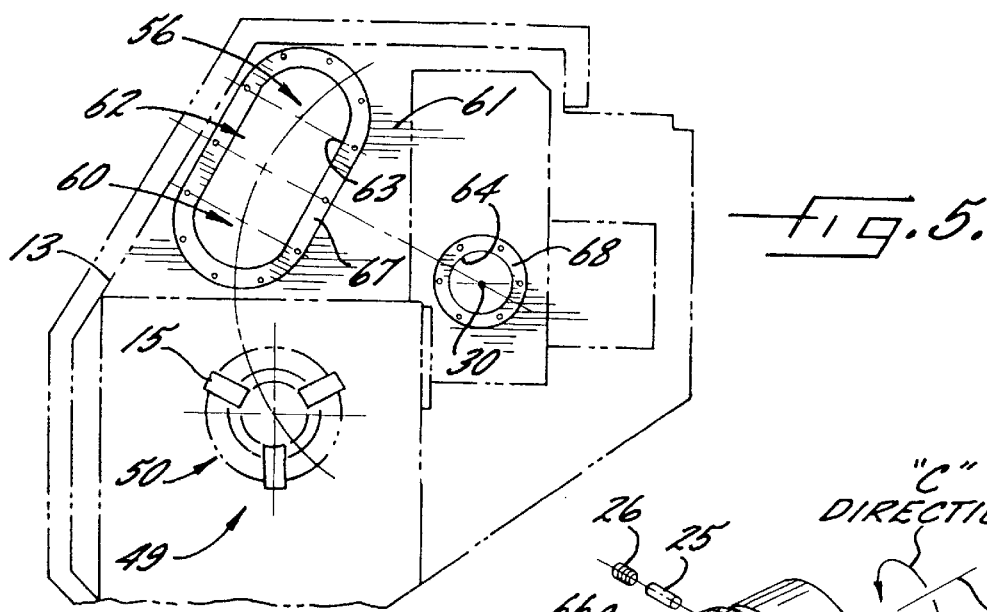
FIG. 5 is a front elevational view of the panel of the present invention shown without the workpiece transfer apparatus.

One of the walls 17 of the enclosure 16 comprises a panel 61 mounted to the machine frame 13 so as to have a transfer station 62, such as the loading station 56 and/or unloading station 60 discussed above, on one side thereof. The panel 61 is also mounted so as to have the chuck 15 on the other side of the panel from the transfer station 62. The panel 61 has a first opening 63 therethrough which is adjacent to the transfer station 62. The panel 61 may also have a second opening 64 through which the shaft 24 of the gripper arm 23 extends. The respective openings of the panel 61 and their relationship to the chuck 15 are best shown in FIG. 5. When the gripper arm 23 is in the first position, the gripper jaw assemblies 27, 28 extend through the first opening and are adjacent the respective transfer station 62. When the gripper arm 23 is in the second position, the gripper jaw assemblies 27, 28 are adjacent the chuck 15.

To move the gripper arm 23 of the present invention to the first position, the gripper arm 23 is rotated until the head 18 is in axial alignment with the first opening 63. The gripper arm 23 is then moved axially toward the opening 63 so that the first and second gripper jaw assemblies, 27, 28 according to the embodiment discussed above, move through the opening to the loading 56 and unloading stations 60 respectively.

As is clearly seen in FIG. 3, the size and shape of the first opening 63 corresponds to the size and shape of the head 18 of the gripper arm 23. In addition, the head 18 has a flange 65 surrounding the gripper jaw assemblies 27, 28 so as to provide a surface to mate against the panel surface 67 surrounding the opening. Thus, when the gripper arm 23 is moved to the first position, the gripper jaw assemblies 27, 28 are behind the panel 61 relative to the cutting area and are shielded from chips and coolant by the head 18 of the gripper arm 23. Preferably, an elastomeric seal 66 may be affixed to the flange 65 of the gripper arm head 18 so as to provide an improved seal with the panel surface 67.

The panel 61 may also include a second opening 64 positioned such that the drive shaft 24 extends axially therethrough. The gripper arm 23 may also mate with the panel surface 68 surrounding the second opening 64 to preclude the passage of debris to the first and second drive means 38, 39. An elastomeric seal 66a may also be provided to seal the second opening 64.

The gripper arm 23 may also include an extensible cover 69 surrounding the shaft 24. In a preferred embodiment, the cover 69 comprises a telescoping tube which extends from the gripper arm 23 to at least the panel 61, and may extend through the second opening 64 to the second nut 40, as shown in FIG. 9. The cover 69 ensures that chips and coolant do not interfere with action of the shaft 24 and rotatable nuts 33, 40.

The gripper jaw assemblies 27, 28 may each include jaw means 70, 71, as shown in FIG. 6, for selectively gripping and releasing workpieces 11. The jaw means 70 of the first gripper jaw assembly 27 may include two moveable jaws 72 which are selectively moveable towards and away from each other. The jaw means 71 of the second gripper jaw assembly 28 may include three moveable jaws 73 which are selectively moveable towards and away from each other. The moveable jaws 72, 73 are pneumatically actuated by air hoses 74 extending through the gripper arm 23 and the drive shaft 24 to a compressed air source (not shown).

The gripper jaw assemblies 27, 28 may each also include a compressible pusher plate 75 interposed between the moveable jaws 72, 73. The pusher plates 75 are generally circular and of a larger diameter than the workpieces 11 and may be mounted to the gripper arm 23 on spring-loaded slides 76. Accordingly, in the case of the second gripper jaw assembly 28, the pusher plate 75 contacts the workpiece 11a and is compressed as the gripper jaw assembly 28 is moved towards the chuck 15. Thus, when the gripper jaws 72, 73 are in the closed position and the workpiece 11 is gripped therein, the pusher plate 75 maintains a force against the workpiece.

When the workpiece 11 is then moved to either the chuck 15 (as with the first gripper jaw assembly 27) or to the unload station 60 at the output chute 57 (as with the second gripper jaw assembly 28) the workpiece 11 will be pushed away from the gripper arm 23 when the jaws 72, 73 are opened. This is desirable because the action of the pusher plate 75 ensures that the workpiece 11 is firmly seated in the chuck 15 or output chute 57 as the jaws 72, 73 are released and the gripper arm assembly 23 is moved away from the workpiece 11.

As shown in FIG. 8, the input chute means 54 may include one or more bottom rails 77 and first and second side rails 81, 82 for supporting an unmachined workpiece 11 as it rolls down the input chute 54. A bumper 55 is located at the bottom end of the chute 54 and a proximity sensor 79 may be positioned adjacent thereto to sense workpieces 11 at the bottom of the chute 54. The bottom of the input chute 54 thus defines the loading station 56.

The input chute 54 is also provided with a retractable gate 80 located between the two lowermost workpiece positions which can restrain workpieces 11 from rolling to the end of the chute 54. The operation of the gate 80, as discussed in more detail below, may be controlled by the control means 46 in response to signals from the sensor 79.

The first side rail 81 facing the gripper arm 23 does not completely extend to the bumper 55 so that an opening 83 is formed at the lowermost end of the input chute 54. The second side rail 82 extends completely to bumper 55. When picked up by the first gripper jaw assembly 27, the workpiece 11 may be removed from the input chute 54 through the opening 83 in the first side rail 81.

Stop means 84 comprising one or more pusher plate stops are located adjacent to the first side rail opening 83 and may be fixed to the input chute 54. The stops 84 extend into the opening 83 by an amount sufficient to contact and compress the pusher plate 75 as it is moved towards the unload station 60. The stops 84 are also generally coplanar with the inner surface of the first side rail 81. Accordingly, when the first gripper jaw assembly 27 is moved to the loading station 56 and the jaws 72 extend into the input chute 54, the pusher plate 75 is compressed against the fixed stops 84 and forms a temporary extension of the first side rail 81 over the opening 83, as explained in more detail below.

Workpieces 11 are loaded into the first gripper jaw assembly 27 as follows. Immediately after an unmachined workpiece 11 has been removed from the input chute 54, the remaining workpieces in the input chute are restrained by the retractable gate 80, which remains in the lowered position. Accordingly, at this point there is not a workpiece at the loading station 56.

After the workpiece 11 has been placed in the chuck 15, the jaws 72 of the first gripper jaw assembly 27 are opened and the gripper arm 23 returns to the first position as discussed above. The gripper arm 23 is moved towards the panel 61 so that the open jaws 72 of the first gripper jaw assembly 27 extend into the input chute 54 through the opening 83. Also, the pusher plate 75 is compressed against the stops 84 when the gripper jaw assembly 27 is moved to this position. The machining operation can now be performed and, as discussed above, the position of the gripper arm head 18 prevents chips and coolant from passing through the opening and interfering with the operation of the gripper jaw assemblies 27, 28.

At sometime during the machining operation, the retractable gate 80 is opened and the next unmachined part is allowed to roll down until it strikes the bumper 55. Only one retractable gate is necessary, unlike the two gate escapement of conventional devices discussed above, because when the gate 80 is opened, only one workpiece 11 can advance. That workpiece rests against the bumper 55 and the next workpiece rests against the first at a position behind the gate 80. This is not possible with conventional devices because the next in line workpiece would interfere with the operation of the conventional three jawed gripper assembly. Thus, the gate 80 can be closed for the next cycle and only one workpiece 11 will have been advanced.

As the lowermost workpiece rolls toward the bumper 55 it is supported by the bottom rail 77, the second side rail 82 and the pusher plate 75 which, as discussed above, is generally coplanar with the first side rail 81 facing the gripper arm 23. This arrangement allows the workpiece 11 to be fully supported from three sides and the compressed pusher plate 75 acts as an extension of the first side rail 81. Also, the opened two jaws 72 of the first gripper jaw assembly 27 allow the workpiece 11 to roll into the position defined as the loading station 56 so that, when the jaws 72 are closed, the workpiece 11 will be securely gripped. After the contemporaneous machining operation has been completed, the unmachined workpiece 11 can then be withdrawn from the input chute 54 through the opening 83. The pusher plate stops 84 do not extend into the opening 83 to an extent which would interfere with the removal of the workpiece 11.

In the drawings and specification, preferred embodiments of the invention have been illustrated and described, and although specifications are employed, they are used in a generic and descriptive sense and not for the purposes of limitation.

That which is claimed is:

1. An apparatus for sequentially transferring a series of workpieces from a transfer station, said apparatus comprising a machine frame, a gripper arm mounted to said frame for movement towards and away from the transfer station, a gripper jaw assembly comprising two jaws mounted on said gripper arm for releasably engaging a workpiece when said gripper arm is positioned adjacent the transfer station, a compressible pusher plate mounted to said gripper arm so as to resiliently engage a workpiece engaged by said jaws when said pusher plate is compressed, stop means mounted to said machine frame for stopping said pusher plate as said gripper arm is moved towards the transfer station so as to compress said pusher plate, and chute means mounted to said frame for advancing one of the series of workpieces to the transfer station when said gripper arm is positioned adjacent the transfer station so as to position the workpiece between said jaws.

2. The apparatus as defined in claim 1 wherein said chute means comprises a bottom rail declined downwardly towards the transfer station, a bumper at the lower end of the bottom rail, a first side rail adjacent said gripper arm and extending along said bottom rail, said first side rail having an opening adjacent the transfer station wherethrough workpieces may be transferred from the transfer station, and a second side rail opposite said gripper arm and extending along said bottom rail to the transfer station.

3. The apparatus as defined in claim 2 wherein said chute means further comprises a selectively operable gate between said rails and removed from said transfer station for selectively restraining workpieces from rolling down said chute means.

4. The apparatus as defined in claim 1 wherein said transfer station comprises a loading station, and further comprising a workpiece unloading means mounted to said machine frame and which defines an unloading station which is adjacent said loading station, wherein said gripper arm further comprises a second gripper jaw assembly comprising a plurality of jaws for releasably engaging a workpiece, and with the first and second gripper jaw assemblies being positioned with respect to each other so that they may be simultaneously positioned at said loading and unloading stations respectively.

5. The apparatus as defined in claim 4 wherein said plurality of jaws of said second gripper assembly comprises three jaws.

6. The apparatus as defined in claim 4 wherein said workpiece unloading means further comprises an output chute for transferring workpieces away from said unloading station.

* * * * *

UNITED STATES PATENT AND TRADEMARK OFFICE
CERTIFICATE OF CORRECTION

PATENT NO. : 5,901,624
DATED : May 11, 1999
INVENTOR(S) : Shiramasa

It is certified that error appears in the above-identified patent and that said Letters Patent is hereby corrected as shown below:

Title page, item [75], in the Inventor's address, after "Fuchu" insert --City--.

Title page, item [73], in the Assignee's address, after "Fuchu" insert --City--.

Signed and Sealed this

Twenty-second Day of May, 2001

Attest:

NICHOLAS P. GODICI

Attesting Officer

Acting Director of the United States Patent and Trademark Office